United States Patent
Lim et al.

(10) Patent No.: US 8,956,701 B2
(45) Date of Patent: Feb. 17, 2015

(54) PROCESS FOR TINTING ARTICLES, AND TINTABLE COMPOSITIONS FOR USE IN SAID PROCESS

(75) Inventors: Yaw Chuan Lim, Singapore (SG); Lixin Song, Singapore (SG); Yu Liu, Singapore (SG)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 0 days.

(21) Appl. No.: 13/884,253

(22) PCT Filed: Nov. 9, 2011

(86) PCT No.: PCT/EP2011/069715
§ 371 (c)(1),
(2), (4) Date: May 8, 2013

(87) PCT Pub. No.: WO2012/062790
PCT Pub. Date: May 18, 2012

(65) Prior Publication Data
US 2013/0230649 A1 Sep. 5, 2013

(30) Foreign Application Priority Data
Nov. 9, 2010 (EP) .................................. 10306233

(51) Int. Cl.
| | | |
|---|---|---|
| *B05D 5/06* | (2006.01) | |
| *G02C 7/10* | (2006.01) | |
| *B41M 5/52* | (2006.01) | |
| *C09D 183/12* | (2006.01) | |
| *G02B 1/10* | (2006.01) | |
| *C09D 171/02* | (2006.01) | |
| *C08G 77/46* | (2006.01) | |
| *C08G 77/50* | (2006.01) | |
| *C08K 5/5435* | (2006.01) | |

(52) U.S. Cl.
CPC ................. *G02C 7/108* (2013.01); *B41M 5/52* (2013.01); *C09D 183/12* (2013.01); *G02B 1/10* (2013.01); *C09D 171/02* (2013.01); *B41M 5/5218* (2013.01); *B41M 5/5263* (2013.01); *B41M 5/529* (2013.01); *C08G 77/46* (2013.01); *C08G 77/50* (2013.01); *C08K 5/5435* (2013.01)
USPC .......... 427/387; 427/162; 427/385.5; 524/765

(58) Field of Classification Search
None
See application file for complete search history.

(56) References Cited

U.S. PATENT DOCUMENTS

| | | | |
|---|---|---|---|
| 4,211,823 A | 7/1980 | Suzuki et al. | 428/412 |
| 7,097,704 B1 | 8/2006 | Pae | 106/287.11 |
| 2002/0193479 A1* | 12/2002 | Treadway | 524/261 |
| 2008/0127432 A1 | 6/2008 | Burguiere et al. | 8/507 |
| 2011/0116034 A1* | 5/2011 | Goto et al. | 351/162 |
| 2012/0045577 A1* | 2/2012 | Feret et al. | 427/162 |

FOREIGN PATENT DOCUMENTS

| | | |
|---|---|---|
| EP | 199874 | 11/1986 |
| EP | 2 248 865 | 11/2010 |
| JP | H08-164667 | 6/1996 |
| JP | 2000-241601 | 9/2000 |
| JP | 2004-106328 | 4/2004 |
| JP | 2004-115597 | 4/2004 |
| JP | 2005-220322 | 8/2005 |
| JP | 2005-232273 | 9/2005 |
| JP | 2009-144089 | 7/2009 |
| WO | WO 01/18128 | 3/2001 |

OTHER PUBLICATIONS

Extended European Search Report issued in European Patent Application No. 10306233.7, dated Apr. 5, 2011.
International Search Report and Written Opinion issued in PCT Patent Application No. PCT/EP2011/069715, mailed Feb. 24, 2012.
International Preliminary Report on Patentability issued in PCT Patent Application No. PCT/EP2011/069715, mailed May 14, 2013.

* cited by examiner

Primary Examiner — Erma Cameron
(74) Attorney, Agent, or Firm — Fulbright & Jaworski LLP

(57) ABSTRACT

The present invention concerns a process for tinting an article, comprising providing an article having a substrate and an ink receptive coating applied thereon, applying on said ink receptive coating a tinting solution containing at least one dye through ink jet printing, said ink receptive coating being obtained by curing an ink receptive coating composition comprising the at least partial hydrolyzate of a component A consisting of one or more compounds containing at least one polyalkylene oxide segment having at least three alkylene oxide units, said segment being chosen from polyethylene oxide, polypropylene oxide and polyethylene oxide-co-polypropylene oxide segments and at least one —Si(X)n hydrolyzable group, in which n is an integer ranging from 1 to 3, and the X groups, identical or different, represent OH groups or precursors of OH groups, and optionally, at least one silane component B, components A and optional component B being chosen such that a cross-linked structure is generated upon polymerization of said composition. The invention also concerns an ink receptive coating composition for use in the above process.

24 Claims, No Drawings

PROCESS FOR TINTING ARTICLES, AND TINTABLE COMPOSITIONS FOR USE IN SAID PROCESS

CROSS-REFERENCE TO RELATED APPLICATIONS

This application is a national phase application under 35 U.S.C. §371 of International Application No. PCT/EP2011/069715 filed 9 Nov. 2011, which claims priority to European Application No. 10306233.7 filed 9 Nov. 2010. The entire contents of each of the above-referenced disclosures is specifically incorporated herein by reference without disclaimer.

BACKGROUND OF THE INVENTION

1. Field of the Invention

The present invention relates to a process for tinting articles by ink jet printing, in particular optical and ophthalmic articles such as lenses for eyeglasses. The invention also relates to ink receptive coating compositions which can be used in such a process.

2. Description of Related Art

It is known in the ophthalmic art to tint lenses, coated or not, by dipping lenses into a liquid water based tinting bath maintained at a temperature around 95° C. during several minutes. Classical solutions used during this tinting process are commercially available BPI solutions.

For instance, U.S. Pat. No. 7,097,704 describes coating compositions comprising an additive R1-(OCH$_2$CH$_2$)n-O—R2 wherein at least one of R1 and R2 is a silane containing group represented by the formula:

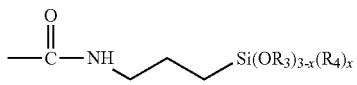

with specified meanings for R$_3$, R$_4$, and x, n being a positive integer.

This additive is used in low amounts in the coating composition to enhance tintability, i.e. from 3% to a maximum of 9% by weight of the liquid coating composition.

Another tinting process is the ink jet printing. The advantage of this process is its fastness and its flexibility, allowing controlling the amount of tinting dye deposited on the article and to choose the area to be tinted on the article. Gradient of coloration can be obtained, as well as coloration pattern as desired.

The tinting composition is generally and preferably a water based solution.

When implementing ink jet printing, it is generally necessary to modify the surface of the article to receive the ink, typically by applying an ink receptive coating on the surface of the article. There are many requirements for the ink receptive coating.

The ink receptive coating has to provide a good resolution for any tinted pattern applied on it. The ink has to be firmly immobilized on/into the ink receptive coating, i.e. exhibit a good adhesion over time. It is preferred that the ink penetrates at least partially or completely the ink receptive coating.

The ink receptive coating may be a permanent coating or a temporary coating being used as a temporary support from which the dyes are transferred into the article. The dyes may be transferred in the substrate constituting the lenses or in a coating of the substrate, adjacent to the ink receptive coating.

Generally, the ink receptive coating composition comprises a hydrophilic polymer, along with a binder and/or additives. The hydrophilic polymer enhances compatibility with the water based ink and an inorganic colloid, such as colloidal silica confers porosity to the layer, so that the dyes more easily penetrate the ink receptive coating.

EP 199874 describes an ink jet recording sheet comprising a support and an ink receptive layer containing polyethylene oxide and a white filler.

The molecular weight of the polyethylene oxide used may range from 100,000 to 900,000 and preferably from 100,000 to 300,000. EP 199874 clearly mentions that polyethylene oxide does not provide sufficient binding strength to satisfy all requirements of a recording process. It is then preferred to include an additional resin in the composition to enhance the binding strength. No binder based on polymerizable silanes is described.

WO 01/18128 discloses a coating composition for lenses, containing partially hydrolyzed epoxyalkoxysilanes and a polyether surfactant that improves the tinting ability of the cured coating. The surfactant can be chosen from inert, non-reactive organosilicones containing a polyoxyalkylene group, which are free of hydrolyzable groups.

EP 2248865 discloses an antistatic sol/gel forming coating composition comprising at least one inorganic metal salt and a hydrolyzate resulting from the at least partial hydrolysis of compounds containing at least one polyalkylene oxide segment and at least one silicon atom bearing hydrolyzable groups. Said composition generates a cross-linked structure upon polymerization, and its dry extract contains less than 5% by weight of free polyalkylene oxide polymers.

JP 2000241601 describes a process for tinting plastic lenses comprising the following steps:
  forming a coating on the surface of a plastic lens to be dyed, the coating comprising a water soluble polymer such as polyvinyl alcohol or polyethyleneglycol;
  applying a solution containing disperse dye on the above coating;
  heating to diffuse the disperse dye in the lens;
  removing the coating by washing;

US20080127432 describes a method for coloring an optical lens comprising the following stages:
a) preparation of a transparent printing primer comprising
(1) a binder composed of an aqueous dispersion of polymer, preferably an anionic polyurethane,
(2) an agent which enhances the diffusion of ink into the aqueous dispersion of polymer, said agent comprising a colloid; and/or
3) an agent which enhances the absorption of ink into the aqueous dispersion of polymer, said agent comprising an absorbent polymer, which might be a poly(alkylene) oxide;
b) deposition of the transparent printing primer;
c) drying the printing primer;
d) printing, using an ink jet printer, the printing primer covering the substrate and
e) drying the ink.

Preferably, the absorbent polymer is a polyvinyl alcohol. The amount of PVA is between 10 and 50% inclusive of the total weight of dry matter.

JP2005232273, JP2005220322, JP2004115597 and JP2004106328 disclose ink receptor layers for ink jet printing made of a polyurethane matrix which is further reacted with an alkoxylsilane bearing an isocyanate group.

All these ink receptor layers comprise alumina fine particles.

JP2009144089 describes tetraalkoxysilanes based coating materials for surface hydrophilization comprising tetraalkoxysilanes and/or their hydrolyzates, alkoxysilyl containing polyoxyethylenes (average molecular weight of polyoxyethylenes 400-2000, polyoxyethylene units content 40-75% and alkoxysilyl units content 15-40%), H2O, and hydrophilic organic solvents. JP2009144089 does not relate to ink jet printing.

The ink receptive layers for ink jet tinting described in the prior art have several drawbacks.

The polyethyleneglycol, being not linked to the matrix, can soften or partially melt when the ink receptive layer is heated, implying homogeneity problems.

The presence of filler may increase the haze of the ink receptor coating.

An aim of the invention is to provide a novel process for tinting articles by ink jet printing.

Another aim is to provide a novel process for tinting articles by ink jet printing providing a more intense coloration than in the prior art, while preserving homogeneity of the tinting.

Another aim of the invention is provide a novel process for tinting articles which is simple to implement and provides a tinted article having a low level of haze, either the article is tinted or not, and a good resolution of pattern

SUMMARY OF THE INVENTION

The present inventors have found that the above goals are achieved by providing a process for tinting an article comprising:
  (a) providing an article having a substrate and an ink receptive coating applied thereon;
  (b) applying on said ink receptive coating a tinting solution containing at least one dye through ink jet printing, said ink receptive coating being obtained by curing an ink receptive coating composition comprising:
  1) the at least partial hydrolyzate of a component A consisting of one or more compounds containing at least one polyalkylene oxide segment having at least three alkylene oxide units, said segment being chosen from polyethylene oxide, polypropylene oxide and polyethylene oxide-co-polypropylene oxide segments and at least one —Si(X)$_n$ hydrolyzable group, preferably at least two, and more preferably 2, in which n is an integer ranging from 1 to 3, and the X groups, identical or different, represent OH groups or precursors of OH groups, and
  2) optionally, at least one component B consisting of one or more compounds of formula:

(I)

or a hydrolyzate thereof, in which the R groups, identical or different, represent monovalent alkyl groups, the Z groups, identical or different, represent hydrolyzable groups or hydrogen atoms, and n' is an integer equal to 0, 1 or 2, preferably 0, with the proviso that the Z groups do not all represent an hydrogen atom when n'=0, and preferably do not all represent a hydrogen atom,
and/or one or more compounds of formula:

(II)

or a hydrolyzate thereof, in which the R$^1$ groups, identical or different, represent monovalent organic groups linked to the silicon atom through a carbon atom, the Y groups, identical or different, represent monovalent organic groups linked to the silicon atom and containing at least one epoxy function, the Z$^1$ groups, identical or different, represent hydrolyzable groups or hydrogen atoms, m1 and n1 are integers such that m1 is equal to 1 or 2 and n1+m1=1 or 2;

component A and optional component B being chosen such that a cross-linked structure is generated upon polymerization of said composition,
  and said ink receptive coating composition is not an antistatic sol/gel forming coating composition comprising at least one inorganic metal salt and having a dry extract containing less than 5% by weight of free polyalkylene oxide polymers,
  and wherein the theoretical dry extract of component A represents 40 to 100% by weight based on the weight of the theoretical dry extract of said ink receptive composition.

The inventors have found that after hydrolysis, inorganic end groups are internally produced contributing to the porosity of the film, which is favorable to get a good penetration of the dyes in the ink receptive coating.

Due to this specific structure, it is possible to minimize or even suppress inorganic fillers in the ink receptive coating.

Besides, the ink receptive layers used in the process of the invention suppress the drawbacks of the ink receptive layers of the prior art which were due to the absence of any link between the PEO (polyethylene oxide) group and the matrix of the ink receptive layer.

The compositions used in the process of the invention preferably do not comprise free PEO group containing compound.

By "free PEO group containing compound" it is meant herein a PEO group containing compound that is not chemically linked to an inorganic matrix such as a polysiloxane matrix.

On the contrary, polymerizable compounds of component A which have Si(X)$_n$ hydrolyzable groups are not free PEO as they react to be chemically linked to the crosslinked structure generated upon polymerization of the composition.

By <<dry extract>>, it is meant herein solid matters that remain after evaporation of the solvents, preferably under vacuum up to 100° C.

The dry extract and the dry extract weight of a component in a composition can also be theoretically calculated as explained hereunder.

The present invention also concerns an ink receptive coating composition comprising:
  1) the at least partial hydrolyzate of a component A consisting of one or more compounds containing at least one polyalkylene oxide segment having at least three alkylene oxide units, said segment being chosen from polyethylene oxide, polypropylene oxide and polyethylene oxide-co-polypropylene oxide segments and at least one —Si(X)$_n$ hydrolyzable group, preferably at least two, and more preferably 2, in which n is an integer ranging from 1 to 3, and the X groups, identical or different, represent OH groups or precursors of OH groups, and
  2) optionally, at least one component B consisting of one or more compounds of formula:

(I)

or a hydrolyzate thereof, in which the R groups, identical or different, represent monovalent alkyl groups, the Z groups, identical or different, represent hydrolyzable groups, and n' is an integer equal to 1 or 2
and/or one or more compounds of formula:

(II)

or a hydrolyzate thereof, in which the R$^1$ groups, identical or different, represent monovalent organic groups linked to the silicon atom through a carbon atom, the Y groups, identical or different, represent monovalent organic groups linked to the silicon atom and containing at least one epoxy function, the $Z^1$ groups, identical or different, represent hydrolyzable groups or hydrogen atoms, m1 and n1 are integers such that m1 is equal to 1 or 2 and n1+m1=1 or 2;

component A and optional component B being chosen such that a cross-linked structure is generated upon polymerization of said composition, and said ink receptive coating composition is not an antistatic sol/gel forming coating composition comprising at least one inorganic metal salt and having a dry extract containing less than 5% by weight of free polyalkylene oxide polymers, and wherein the theoretical dry extract of component A represents 40 to 100% by weight based on the weight of the theoretical dry extract of said ink receptive composition.

The process of the invention can be used to prepare permanent coating or temporary coating, both being tintable by ink jet printing.

When the ink receptive coating is a temporary coating, the ink receptive coating is tinted by ink jet printing, then the dye(s) are transferred into the substrate and the ink receptive coating is preferably removed.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF THE INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

When an optical article comprises one or more surface coatings, the phrase "to deposit a coating or layer onto the optical article" means that a coating or layer is deposited onto the outermost coating of the optical article, i.e. the coating which is the closest to the air.

A coating that is "on" a side of a lens is defined as a coating that (a) is positioned over that side, (b) need not be in contact with that side, i.e., one or more intervening coatings may be disposed between that side and the coating in question, and (c) need not cover that side completely.

The optical article prepared according to the process of the present invention is preferably a lens or lens blank, and more preferably an ophthalmic lens or lens blank. The optical article may be coated on its convex main face (front side), concave main face (back side), or both faces with the ink receptive coating according to the invention.

Herein, the term "lens" means an organic or inorganic glass lens, comprising a lens substrate which may be coated with one or more coatings of various natures.

The lens substrate may be made of mineral glass or organic glass, preferably organic glass. The organic glasses can be either thermoplastic materials such as polycarbonates and thermoplastic polyurethanes or thermosetting (cross-linked) materials such as diethylene glycol bis(allylcarbonate)polymers and copolymers (in particular CR-39® from PPG Industries), thermosetting polyurethanes, polythiourethanes, polyepoxides, polyepisulfides, poly(meth)acrylates and copolymers based substrates, such as substrates comprising (meth)acrylic polymers and copolymers derived from bisphenol-A, polythio(meth)acrylates, as well as copolymers thereof and blends thereof. Preferred materials for the lens substrate are polycarbonates (PC) and diethylene glycol bis(allylcarbonate)polymers, in particular substrates made of polycarbonate.

The optical article comprising a substrate used herein may also be a carrier or film onto which the ink receptive coating is stored. It can be transferred later from the carrier onto the substrate of e.g. an optical lens.

The ink receptive coating applied using the process of the invention may be deposited onto a naked substrate or onto the outermost coating layer of the substrate if the substrate is coated with at least one surface coating. Said at least one surface coating may be, without limitation, an impact-resistant coating (impact resistant primer), an abrasion and/or scratch resistant coating, a polarized coating, a photochromic coating.

The impact-resistant coating which may be used in the present invention can be any coating typically used for improving impact resistance of a finished optical article. This coating generally enhances adhesion of the abrasion and/or scratch-resistant coating on the substrate of the finished optical article. By definition, an impact-resistant primer coating is a coating which improves the impact resistance of the finished optical article as compared with the same optical article but without the impact-resistant primer coating.

Typical impact-resistance primer coatings are (meth)acrylic based coatings and polyurethane based coatings, in particular coatings made from a latex composition such as a poly(meth)acrylic latex, a polyurethane latex or a polyester latex.

Their thickness generally ranges from 0.5 to 2 μm, preferably around 1 μm.

The abrasion- and/or scratch-resistant coating which may be used in the present invention can be any coating typically used for improving abrasion- and/or scratch-resistance of a finished optical article as compared to a same optical article but without the abrasion- and/or scratch-resistant coating.

The abrasion and/or scratch resistant coating composition, which upon curing, leads to the abrasion and/or resistant coating generally comprises solvents such as alcoholic solvent, for example methanol, ethanol, propanol, or ketonic solvents or other kind of solvents that may affect the integrity of the coating on which it is applied, if this latter coating is not sufficiently cured or not crosslinked and/or comprises species not covalently linked.

Preferred abrasion- and/or scratch-resistant coatings are (meth)acrylate based coatings and silicon-containing coatings. The latter are more preferred and are disclosed, for example, in French patent application FR 2702486, which is incorporated herein by reference.

The thickness of the abrasion resistant coating generally ranges from 1 μm to 10 μm, preferably from 2 to 6 μm, more preferably from 3 to 5 μm.

The inventive curable coating composition applied onto the substrate provides, upon curing, a functional transparent coating having ink receptive properties.

The ink receptive coating composition may be a solution or dispersion, both terms being equivalent in the present patent application. These terms refer to a mixture of components which generally is uniform at the macroscopic scale (visually) and are not related to a particular solubility state or particle size of said components.

A main constituent of the ink receptive coating composition used in the process of the invention is a hydrolyzate resulting from the hydrolysis of component A consisting of one or more compounds containing at least one polyalkylene oxide segment having at least three alkylene oxide units, said segment being chosen from polyethylene oxide, polypropylene oxide and polyethylene oxide-co-polypropylene oxide segments, and at least one —Si(X)$_n$ hydrolyzable group, preferably at least two, and more preferably 2, in which n is an integer ranging from 1 to 3, and the X groups, identical or different, represent OH groups or precursors of OH groups. —Si(X)$_n$ is considered herein as being a hydrolyzable group even if at least one of the X groups is a OH group.

It is preferred that the polyalkylene oxide segment comprises at least 50% ethylene oxide units (with respect to the total number of units in said segment), preferably more than 70% ethylene oxide units, and better 100% of ethylene oxide units.

By "precursor of an OH group", it is meant a group that generates an OH group upon hydrolysis.

By "polyethylene oxide-co-polypropylene oxide", it is meant any copolymer of ethylene oxide and propylene oxide.

Preferably, the compounds constituting component A comprise at least one —Si(X)$_n$, preferably one SiX$_3$, hydrolyzable group at one terminal position of the compound molecule.

More preferably, the compounds constituting component A comprise two —Si(X)$_n$, preferably two SiX$_3$, hydrolyzable groups, each at one terminal position of said compound.

X may be a OH group, a H atom or any atom or radical that upon hydrolysis leads to a hydroxyl group, such as a halogen, in particular Cl, or an OR' group in which R' is an alkyl radical, preferably a C$_1$-C$_4$ alkyl radical, in particular CH$_3$ or C$_2$H$_5$. Preferably, X groups are precursors of OH groups.

A preferred class of compounds of component A are compounds of formula:

(R$^2$O)$_3$SiR$^3$(CH$_2$CH$_2$O)$_x$R$^4$ (III)

in which:
R$^2$, identical or different, is an alkyl group, preferably a C$_1$-C$_4$ alkyl group, in particular CH$_3$ or C$_2$H$_5$,
R$^3$ is a divalent radical, preferably a —(CH$_2$)$_{x1}$— or a —(CH$_2$)$_{x2}$—NHC(O)— radical, in which x1 and x2 are integers from 1 to 4, preferably from 1 to 3,
R$^4$ is H, an alkyl group, preferably a C$_1$-C$_4$ alkyl group, in particular CH$_3$ or C$_2$H$_5$, a R$^5$—C(O)— group in which R$^5$ is an alkyl radical, preferably a C$_1$-C$_4$ alkyl radical, or a —R$^3$Si(OR$^2$)$_3$ group in which R$^2$ and R$^3$ are defined as above, and,
x is an integer from 4 to 50, preferably from 5 to 35, more preferably from 9 to 35.

Best ink receptive coatings are obtained for x ranging from 20 to 30.

Examples of commercial compounds of formula (111) are:
Bis[N,N'-(triethoxysilyl propyl)aminocarbonyl]polyethylene oxide (13-14EO);
Bis[triethoxysilyl propyl]polyethylene oxide (25-30EO);
Bis[(3-methyldimethoxy silyl)propyl]propylene oxide (6-8 EO);
2-(methoxy(polyethylene oxy)propyl)trimethoxy silane;
2-(acetoxy(polyethylene oxy)propyl)triethoxy silane;
2-(methoxy(polyethylene oxy)propyl trimethoxy silane;
N-(triethoxy silyl propyl)-O-polyethylene oxide urethane;
Methoxy(polyethyleneoxy)propyltrimethoxysilane (10 -11 EO).

Most of these compounds may be obtained from Gelest Inc.

The theoretical dry extract of component A represents 40 to 100%, preferably 40 to 95%, more preferably 50 to 90%, even better 60 to 90% by weight based on the weight of the theoretical dry extract of the ink receptive coating composition.

Preferably, the compounds constituting component A have a molecular weight <3000 g/mol, more preferably ranging from 500 to 2000 g/mol.

As indicated previously, the one or more compounds of optional component B can be a compound of formula:

R$_n$Si(Z)$_{4-n'}$ (I)

or a hydrolyzate thereof, in which the R groups, identical or different, represent monovalent alkyl groups, the Z groups, identical or different, represent hydrolyzable groups or hydrogen atoms, and n' is an integer equal to 0, 1 or 2, preferably 0, with the proviso that the Z groups do not all represent an hydrogen atom when n'=0, and preferably do not all represent a hydrogen atom.

Silanes of formula (I) bear two to four Z groups directly linked to the silicon atom, each leading to an OH group upon hydrolysis and one or two monovalent organic R groups linked to the silicon atom. It is worth noting that SiOH bonds may be initially present in the compounds of formula (I), which are considered in this case as hydrolyzates. Hydrolyzates also encompass siloxane salts.

The Z groups may represent hydrolyzable groups independently chosen from the hydrolyzable groups which have been previously cited when describing the X groups. Preferably, the Z groups are hydrolyzable groups which are identical or different.

The most preferred R groups are C$_1$-C$_4$ alkyl groups, such as methyl, ethyl, n-propyl, i-propyl, n-butyl, i-butyl, preferably methyl groups.

Most preferred compounds of formula (I) are those having formula Si(Z)$_4$. Examples of such compounds are tetraalkoxysilanes such as tetraethoxysilane Si(OC$_2$H$_5$)$_4$ (TEOS), tetramethoxysilane Si(OCH$_3$)$_4$ (TMOS), tetra(n-propoxy)silane, tetra(i-propoxy)silane, tetra(n-butoxy)silane, tetra(sec-butoxy)silane or tetra(t-butoxy)silane, preferably TEOS.

Compounds of formula (I) may also be chosen from alkylalkoxysilanes, including compounds of formula RSi(Z)$_3$, for example alkyltrialkoxysilanes such as methyl triethoxysilane (MTEOS), or compounds of formula R$_2$Si(Z)$_2$, for example dialkyldialkoxysilanes such as dimethyldiethoxysilane.

The optional compound B can also be at least one compound of formula:

R$^1_{n1}$Y$_{m1}$Si(Z$^1$)$_{4-n1-m1}$ (II)

or a hydrolyzate thereof, in which the R$^1$ groups, identical or different, represent monovalent organic groups linked to the silicon atom through a carbon atom, the Y groups, identical or different, represent monovalent organic groups linked to the silicon atom through a carbon atom and containing at least one epoxy function, the Z$^1$ groups are identical or different and represent hydrolyzable groups or hydrogen atoms, m1 and n1 are integers such that m1 is equal to 1 or 2 and n1+m1=1 or 2.

The Z$^1$ groups may independently and without limitation represent H, alkoxy groups —O—R$^6$, wherein R$^6$ preferably represents a linear or branched alkyl or alkoxyalkyl group, preferably a $C_1$-$C_4$ alkyl group, an acyloxy groups —O—C(O)$R^7$, wherein $R^7$ preferably represents an alkyl group, typically a $C_1$-$C_6$ alkyl group, and more preferably a methyl or ethyl group, a halogen group such as Cl and Br, an amino group optionally substituted with one or two functional groups such as an alkyl or silane group, for example the NHSiMe$_3$ group, an alkylenoxy group such as the isopropenoxy group, a trialkylsiloxy group, for example the trimethylsiloxy group.

The $Z^1$ groups are preferably alkoxy groups, in particular methoxy, ethoxy, propoxy or butoxy, more preferably methoxy or ethoxy. In this case, compounds of formula (II) are alkoxysilanes.

The integers n1 and m1 define three groups of compounds (II): compounds of formula $R_1YSi(X)^1{}_2$, compounds of formula $Y_2Si(X)^1{}_2$, and compounds of formula $YSi(Z^1)_3$. Among these compounds, epoxysilanes having the formula $YSi(Z^1)_3$ are preferred.

The monovalent $R^1$ groups linked to the silicon atom through a Si—C bond are organic groups. These groups may be, without limitation, hydrocarbon groups, either saturated or unsaturated, preferably $C_1$-$C_{10}$ groups and better $C_1$-$C_4$ groups, for example an alkyl group, preferably a $C_1$-$C_4$ alkyl group such as methyl or ethyl, an aminoalkyl group, an alkenyl group, such as a vinyl group, a $C_6$-$C_{10}$ aryl group, for example an optionally substituted phenyl group, in particular a phenyl group substituted with one or more $C_1$-$C_4$ alkyl groups, a benzyl group, a (meth)acryloxyalkyl group, or a fluorinated or perfluorinated group corresponding to the above cited hydrocarbon groups, for example a fluoroalkyl or perfluoroalkyl group, or a (poly)fluoro or perfluoro alkoxy [(poly)alkyloxy]alkyl group.

The most preferred $R^1$ groups are alkyl groups, in particular $C_1$-$C_4$ alkyl groups, and ideally methyl groups.

The monovalent Y groups linked to the silicon atom through a Si—C bond are organic groups since they contain at least one epoxy function, preferably one epoxy function. By epoxy function, it is meant a group of atoms, in which an oxygen atom is directly linked to two adjacent carbon atoms or non adjacent carbon atoms comprised in a carbon containing chain or a cyclic carbon containing system. Among epoxy functions, oxirane functions are preferred, i.e. saturated three-membered cyclic ether groups.

Epoxysilanes compounds of formula (II) provide a highly cross-linked matrix. The preferred epoxysilanes have an organic link between the Si atom and the epoxy function that provides a certain level of flexibility.

The preferred Y groups are groups of formulae (IV) and (V):

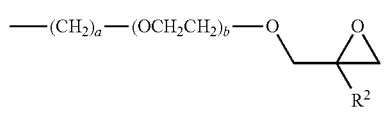

IV

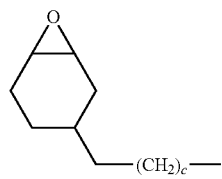

V in which $R^2$ is an alkyl group, preferably a methyl group, or a hydrogen atom, ideally a hydrogen atom, a and c are integers ranging from 1 to 6, and b is 0, 1 or 2.

The preferred group having formula (IV) is the γ-glycidoxypropyl group ($R^2$=H, a=3, b=0) and the preferred (3,4-epoxycyclohexyl)alkyl group of formula (V) is the β-(3,4-epoxycyclohexyl)ethyl group (c=1). The γ-glycidoxyethoxypropyl group may also be employed ($R^2$=H, a=3, b=1).

Preferred epoxysilanes of formula (II) are epoxyalkoxysilanes, and most preferred are those having one Y group and three alkoxy $Z^1$ groups. Particularly preferred epoxytrialkoxysilanes are those of formulae (VI) and (VII):

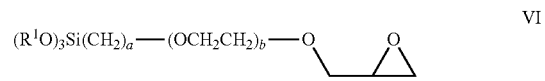

VI

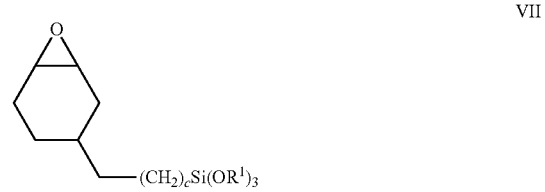

VII in which $R^1$ is an alkyl group having 1 to 6 carbon atoms, preferably a methyl or ethyl group, and a, b and c are such as defined above.

Examples of such epoxysilanes include but are not limited to glycidoxy methyl trimethoxysilane, glycidoxy methyl triethoxysilane, glycidoxy methyl tripropoxysilane, α-glycidoxy ethyl trimethoxysilane, α-glycidoxy ethyl triethoxysilane, β-glycidoxy ethyl trimethoxysilane, β-glycidoxy ethyl triethoxysilane, β-glycidoxy ethyl tripropoxysilane, α-glycidoxy propyl trimethoxysilane, α-glycidoxy propyl triethoxysilane, α-glycidoxy propyl tripropoxysilane, β-glycidoxy propyl trimethoxysilane, β-glycidoxy propyl triethoxysilane, β-glycidoxy propyl tripropoxysilane, γ-glycidoxy propyl trimethoxysilane, γ-glycidoxy propyl triethoxysilane, γ-glycidoxy propyl tripropoxysilane, 2-(3,4-epoxycyclohexyl)ethyltrimethoxysilane, 2-(3,4-epoxycyclohexyl)ethyltriethoxysilane. Other useful epoxytrialkoxysilanes are described in Patents U.S. Pat. Nos. 4,294,950, 4,211,823, 5,015,523, EP 0614957 and WO 94/10230, which are hereby incorporated by reference. Among those silanes, γ-glycidoxypropyltrimethoxysilane (GLYMO) is preferred.

Preferred epoxysilanes of formula (II) having one Y group and two $Z^1$ groups include, but are not limited to, epoxydialkoxysilanes such as γ-glycidoxypropyl-methyl-dimethoxysilane, γ-glycidoxypropyl bis(trimethylsiloxy)methylsilane, γ-glycidoxypropyl-methyl-diethoxysilane, γ-glycidoxypropyl-methyl-diisopropenoxysilane, and γ-glycidoxyethoxypropyl-methyl-dimethoxysilane. When epoxy dialkoxysilanes are used, they are preferably combined with epoxytrialkoxysilanes such as those described above, and are preferably employed in lower amounts than said epoxytrialkoxysilanes.

The above optimal compounds act as cross-linking agents of the compounds of component A. Silanes present in the curable ink receptive coating composition may be hydrolyzed partially or totally, preferably totally. Hydrolyzates can be prepared in a known manner, e.g. such as disclosed in FR 2702486 and U.S. Pat. No. 4,211,823. Hydrolysis catalysts such as hydrochloric acid or acetic acid may be used to promote the hydrolysis reaction over the condensation reaction. The hydrolysis may be total or partial.

In one embodiment, a stoichiometric amount of water is added, i.e. the molar amount of added water is corresponding to the molar amount of hydrolysable groups.

In another embodiment, a lower amount of water than necessary for a stoichiometric hydrolysis is added. The polycondensation of silanol groups leading to Si—O—Si units releases additional water in the composition that also acts for hydrolysis.

Component A and optional component B are chosen such that the ink receptive coating composition leads to a cross-linked structure upon polymerization.

If component A consists in a compound having only one $Si(X)_n$ group and wherein n=1, at least one component B is necessarily present in the coating composition and is preferably chosen from components B of formula I wherein n'=0, and components B of formula II wherein $m_1+n_1=1$ (i.e. $n_1=0$).

If component A consists in a compound having only one $Si(X)_n$ group wherein n=2, or only two $Si(X)_n$ groups wherein n=1, at least one component B is necessarily present in the coating composition and is preferably chosen from components B of formula I wherein n'=0 or 1, and components B of formula II, wherein n1+m1=1 or 2, preferably 1.

If component A consists in a compound having only 3 Si—X bonds, especially one $Si(X)_3$ group, component A is able to cross-link by itself.

However, it has been found that it is preferable to add at least a small amount of component B in order to modify the properties, for example in order to improve solvent resistance. Typically, only around 2 to 3% of dry extract of component B consisting in a compound of formula II, wherein $m_1=1$ and $n_1=0$, or consisting in a compound of formula I, wherein n'=0 is able to increase solvent resistance.

The theoretical dry extract of optional component B ranges from 0% to 60% by weight, preferably from 0 to 40% by weight, more preferably from 5 to 30% by weight based on the theoretical dry extract of the composition.

When component B is present, the ink receptive coating composition according to the invention may exhibit better mechanical properties, especially abrasion and/or scratch resistance properties.

Inorganic fillers such as nanoparticles may be present in the ink receptive coating.

Inorganic nanoparticles that are preferably used are nanoparticles of metal oxides, metalloid oxides, nitrides or fluorides.

Examples of nanoparticles that are suitably used in the invention include nanoparticles of the following compounds: $SiO_2$, $Al_2O_3$, $ZrO_2$, $TiO_2$, $Sb_2O_5$, $Ta_2O_5$, $ZnO_2$, $SnO_2$, indium oxide, $Ce_2O_3$, $WO_3$, $Y_2O_3$, $BaTiO_3$, and mixtures thereof.

Nanoparticles may also be composite particles, having more preferably a core/shell structure, for example based on following oxides: $SiO_2/TiO_2$, $SiO_2/ZrO_2$, $SiO_2/TiO_2/ZrO_2$, $TiO_2/SiO_2/ZrO_2/SnO_2$. Such composite particle colloids are available from the Catalysts and Chemical Company.

Nanoparticles are preferably used under a colloidal form, that is to say in the form of fine particles, which diameter (or the longest side) is lower than 1 µm, preferably lower than 150 nm, more preferably lower than 100 nm, even more preferably ranging from 10 to 80 nm, dispersed in a dispersing medium such as water, alcohols, ketones, esters and mixtures thereof, preferably alcohols.

When the ink receptive layer is used as a permanent coating, inorganic nanoparticles are preferably present in the ink receptive coating composition in low amount, preferably less than or equal to 20% by weight, preferably from 0.1 to 10% based on the theoretical dry extract of the curable ink receptive coating composition.

Even better, the permanent ink receptive coating does not comprise inorganic fillers such as nanoparticles.

If inorganic nanoparticles are used in a permanent ink receptive coating, the diameter or longest size of the inorganic nanoparticles is preferably lower than 100 nm.

When the ink receptive layer is used as a temporary layer, the nanoparticles can be used at higher concentrations up to around 60% by weight, based on the theoretical dry extract of the curable ink receptive coating composition.

It is a property of the ink receptive coating composition used in the process of the invention to be tintable by ink jet printing with or without the presence of nanoparticles due to the high amount of component A in the ink receptive coating.

The ink receptive coating composition is not an antistatic sol/gel forming coating composition comprising at least one inorganic metal salt and having a dry extract containing less than 5% by weight of free polyalkylene oxide polymers.

Preferably, said ink receptive coating composition is not an antistatic sol/gel forming coating composition comprising at least one inorganic metal salt.

The inorganic metal salt (also called ionic salt) referred to is any salt classically used for forming solid electrolytes. These salts are disclosed for example in patent application PCT/EP 10 056277, the article "Sol-gel preparation of organic-inorganic hybrid polymer electrolytes and their electrochemical characterizations" (Myong-Hoon Lee, Sung Tae Ko, Kwang Sup Lee and Suh Bong Rhee, Mol. Cryst. Liq. Crypt. 1997 Vol. 294 pp 229-232) and JP2007321014. Preferred inorganic metal salts are ionic salts of formula $M^+ A^-$, wherein $M^+$ is selected from $Li^+$, $Na^+$ and $K^+$, and the anion $A^-$ is selected from $ClO_4^-$, $BF_4^-$, $PF_6^-$, $CF_3SO_3^-$, $CF_3CO_2^-$, $CF_3SO_2^-$, $(CF_3SO_2)_2N^-$ and $(C_2F_5SO_2)_2N^-$.

An antistatic coating is a coating imparting antistatic properties to an article. As used herein, an article having antistatic properties is an article having charge decay times ≤500 milliseconds, measured in the following conditions: the article has been beforehand subjected to a corona discharge at 9000 volts were measured using JCI 155v5 Charge Decay Test Unit from John Chubb Instrumentation at 25.4° C. and 30% or 50% relative humidity.

The unit is set up with JCI 176 Charge Measuring Sample Support, JCI 191 Controlled Humidity Test Chamber, JCI 192 Dry Air Supply Unit and Calibration of voltage sensitivity and decay time measurement performance of JCI 155 to the methods specified in British Standard and Calibration voltage measurements and resistor and capacitor values traceable to National Standards.

Generally the polysiloxane part of the coating represents 75% to 95% by weight of the total weight of the dry coating. The weight of polysiloxane part is the theoretical dry extract of all precursors of the polysiloxane part, including components A and B.

The ink receptive coating composition generally comprises a catalytic amount of at least one curing catalyst such as acetylacetonate metal salts, in particular aluminum acetylacetonate $Al(AcAc)_3$, a hydrolyzate thereof or carboxylates of metals such as zinc, titanium, zirconium, tin or magnesium. Condensation catalysts such as saturated or unsaturated polyfunctional acids or acid anhydrides may also be used, in particular maleic acid, itaconic acid, trimellitic acid or trimellitic anhydride. Numerous examples of curing and/or condensation catalysts are given in "Chemistry and Technology of the Epoxy Resins", B. Ellis (Ed.) Chapman Hall, New York, 1993 and "Epoxy Resins Chemistry and Technology" 2$^{eme}$ edition, C. A. May (Ed.), Marcel Dekker, New York, 1988.

However, it is preferred not to use condensation catalysts such as saturated or unsaturated polyfunctional acids or acid anhydrides may also be used, in particular maleic acid, itaconic acid, trimellitic acid or trimellitic anhydride.

In general, the catalysts described above are used according to the invention in an amount ranging from 0.01 to 10%, preferably from 0.1 to 5% by weight based on the total weight of the curable ink receptive coating composition.

The ink receptive coating composition preferably comprises at least one solvent, preferably a polar solvent, like water, an alcohol, or mixtures thereof, preferably an alcohol, e.g.

methanol, ethanol, n-propanol, isopropanol, n-butanol, isobutanol, sec-butanol, tert-butanol, n-amylic alcohol, isoamylic alcohol, sec-amylic alcohol, tert-amylic alcohol, 1-ethyl-1-propanol, 2-methyl-1-butanol, 1-methoxy-2-propanol n-hexanol, cyclohexanol, ethyl cellosolve (monoethoxy ethylene glycol), and ethylene glycol.

It is also possible to add an appropriate amount of another organic solvent in said composition such as NMP, acetone, tetrahydrofuran, DMSO, DMAc, triethylamine or DMF without being limited to this solvent list. However, the ink receptive coating composition preferably only comprises environmentally benign solvents, such as water and/or $C_1$-$C_4$ alcohols.

The solvent or mixture of solvents may represent from 50 to 99% by weight, relative to the weight of the coating composition, preferably from 50 to 90%, more preferably from 60 to 90%.

The ink receptive coating composition may also comprise at least one non ionic or ionic surfactant, i.e. anionic, cationic or amphoteric surfactant, to improve the wettability of the coating solution or the optical quality of the deposit. A particularly preferred class of surfactants comprises fluorinated surfactants, preferably anionic fluorinated surfactants.

Fluorinated surfactants are known and described generally in "Fluorinated Surfactants" by E. Kissa, Surfactants Science Series, Vol. 50 (Marcel Dekker, New York 1994). Fluorinated surfactants include perfluoroalkanoic acids and salts thereof, in particular perfluorooctanoic acids and salts thereof, such as ammonium perfluorooctanoic acid, fluorinated polyethers or perfluoropolyether surfactants such as disclosed in EP 1059342, EP 712882, EP 752432, EP 816397, U.S. Pat. Nos. 6,025,307, 6,103,843 and 6,126,849. Further fluorinated surfactants are disclosed in U.S. Pat. Nos. 5,229,480, 5,763,552, 5,688,884, 5,700,859, 5,804,650, 5,895,799, WO 00/22002 and WO 00/71590. Fluorinated polyethers derived from hexafluoropropyleneoxide have been described in US 2005/096244. Another class of fluorinated surfactants includes fluorocarbon modified polysiloxane surfactants, e.g. polyalkyleneoxide-modified heptamethyltrisiloxane allyloxypolyethylene glycol surfactant.

The surfactant or mixture of surfactants may represent from 0.001% to 5% by weight, relative to the weight of the coating composition, preferably from 0.02 to 1%, more preferably from 0.05 to 0.5%, even better from 0.05 to 0.3%, and optimally 0.05 to 0.2%.

The ink receptive coating composition may also contain various additives conventionally used in polymerizable compositions, in conventional proportions. These additives include stabilizers such as antioxidants, UV light absorbers, light stabilizers, anti-yellowing agents, adhesion promoters, rheology modifiers, lubricants, cross-linking agents, photoinitiators fragrances, deodorants and pH regulators). They should not deteriorate the optical properties of the article.

The ink receptive coating composition according to the invention generally has a theoretical dry extract weight which represents less than 50% of the total weight of the composition, and preferably ranging from 0.2 to 30%, even better from 0.2 to 20%, which includes both required compounds and optional compounds.

By "theoretical dry extract weight of a component in a composition," it is meant the theoretical weight of solid matter of this component in said composition. The theoretical dry extract weight of a composition is defined as the sum of the theoretical dry extract weights of each of its components. As used herein, the theoretical dry extract weight of compounds of formula I, II or III is the calculated weight in $R_n Si(O)_{(4-n)/2}$ units, $R^1{}_{n1}Y_{m1}Si(O)$ and the calculated weight of units from component A, wherein —Si(X)n is replaced by —$SiO_{n/2}$.

For other components, different from solvents, and which do not undergo chemical transformation, their theoretical dry extract is their own weight.

The ink receptive coating is formed at the surface of an optical article by liquid phase deposition or lamination according to any appropriate method, starting from the above described liquid ink receptive coating composition. Application of said composition may be carried out, without limitation, by spin coating, dip coating, spray coating, brush coating, roller coating. Spin coating and dip coating are preferred.

After application of the ink receptive coating composition onto the surface of the optical article, the composition may be dried or cured, if necessary, according to any appropriate method, for example drying with air, in an oven or by using a drier, so as to provide an ink receptive coating. Generally, a temperature of 50-130° C., preferably 70° C. to 120° C. is employed.

A higher temperature and/or a longer drying/curing step sometimes allow to improve abrasion resistance of the ink receptive coating to the underlying coating or article. Thickness of the ink receptive coating in the final optical article preferably ranges from 5 to 10,000 nm, more preferably from 5 to 5000 nm, even more preferably from 50 to 3000 nm.

The process of tinting of the invention includes a step of ink jet tinting the ink receptive coating composition using classical ink jet tinting processes. The tinting solution is preferably water based.

A typical water based tinting solution applied by ink jet can be prepared by dissolving water based solutions of dyes (such as anthraquinones) with the following compounds: a humectant, such as glycerol, additional water, a surfactant and optionally an organic solvent such as dimethyl ether or dibutyl ether.

Preferably, at least one dye of the tinting solution comprises a sublimable dye.

A preferred process then comprises:

1) heating the article to diffuse the at least one sublimable dye from the ink receptive coating into the substrate and 2) removing the ink receptive coating.

The ink receptive coating can be removed by dissolving it using an appropriate solvent, such as an alcohol, preferably using an ultrasonic apparatus.

The process of the present invention can be used in the ophthalmic lens industry to prepare tinted lenses, but also in the field of photographic films, electronics or food packaging and imaging materials. Particular non limiting uses include electromagnetic windows, optically transparent conductors for display devices and electromagnetic radiation shielding.

According to a specific embodiment, the process can be used to tint a polarizing laminated film or wafer such as a TAC (cellulose triacetate)/PVA (polyvinyl alcohol)/TAC.

Its advantages are numerous and include applicability to most of substrates with good adhesion, in particular plastic substrates, and the production of optical articles having high transmittance, low haze, high scratch/abrasion resistance, compatibility with coatings such as primer coatings and anti-reflection coatings, while maintaining excellent adhesion to other coatings such as primer coatings.

The ink receptive coating used in the process of the invention has a very good ability to be tinted by ink jet printing, especially by using a water-based ink and provides a good resolution and no visible ink beading issue.

The final tinted articles absorb light in the visible range, which means herein that when coated on one side with the ink receptive coating and tinted by ink jet printing, the article has a relative light transmission factor in the visible spectrum, Tv, preferably lower than 75%, more preferably between 40 to lower than 70%. The Tv factor is such as defined in the standard NF EN 1836 and corresponds to the 380-780 nm wavelength range.

The final optical articles prepared according to the invention preferably have low haze characteristics. Haze is a measurement of the transmitted light scattered more than 2.5° from the axis of the incident light. The smaller the haze value, the lower the degree of cloudiness. The haze value of the present optical articles is preferably less than 2%, preferably less than 1%, more preferably less than 0.8%, even better less than 0.5%, and ideally less than 0.25%.

The present optical articles can be processed simply and at low temperature (≤100° C.), using environment friendly solvents (alcohol or water/alcohol co-solvent). The present process is flexible and allows incorporation of other functional coatings onto the substrate.

The ink receptive coating of the invention can be deposited on a main face of a naked substrate, for example a substrate already coated with an abrasion and/or scratch resistant coating or an impact resistant coating or both.

Now, the present invention will be described in more detail with reference to the following examples. These examples are provided only for illustrating the present invention and should not be construed as limiting the scope and spirit of the present invention.

EXAMPLES

1. Testing Methods

The following test procedures were used to evaluate the articles prepared according to the present invention. Three samples for each system were prepared for measurements and the reported data were calculated in the average of three data.

a) Haze Value, Tv and Thickness.

The haze value of the final optical article was measured by light transmission utilizing the Haze-Guard Plus haze meter from BYK-Gardner (a color difference meter) according to the method of ASTM D1003-00, which is incorporated herein in its entirety by reference. All references to "haze" values in this application are by this standard. The instrument was first calibrated according to the manufacturer's directions. Next, the sample was placed on the transmission light beam of the pre-calibrated meter and the haze value was recorded from three different specimen locations and averaged.

Tv was measured using the same device.

Thickness of the films was evaluated by ellipsometer (thickness<1μm) equipped with M44™, EC-270 and LPS-400 with 75 W Xenon Light Source from J. A. Woollam Co. Inc. or with a Metricon Model 2010 Prism Coupler apparatus (thickness>1 μm) from Metricon Corporation.

b) UV Aging:

UV aging is determined during the dry adhesion test after subjecting the coated lenses to a sun test of 200 hours. Suntest apparatus: Atlas CPS+; light intensity: 60 +/−6 klux; chamber temperature: 23 +/−5 C.

c) Dry and Wet Adhesion Test (Crosshatch Test)

Dry adhesion of the transferred coatings was measured using the cross-hatch adhesion test according to ASTM D3359-93, by cutting through the coatings a series of 5 lines, spaced 1 mm apart with a razor, followed by a second series of 5 lines, spaced 1 mm apart, at right angles to the first series, forming a crosshatch pattern comprising 25 squares. After blowing off the crosshatch pattern with an air stream to remove any dust formed during scribing, clear cellophane tape (3M SCOTCH® n° 600) was then applied over the crosshatch pattern, pressed down firmly, and then rapidly pulled away from coating in a direction perpendicular to the coating surface. Application and removal of fresh tape was then repeated two additional times. Adhesion is rated as follows (0 is the best adhesion, 1-4 is in the middle, and 5 is the poorest adhesion):

TABLE 1

| Adhesion score | Squares removed | Area % left intact |
|---|---|---|
| 0 | 0 | 100 |
| 1 | <1 | >96 |
| 2 | 1 to 4 | 96-84 |
| 3 | >4 to 9 | 83-64 |
| 4 | >9 to 16 | 63-36 |
| 5 | >16 | <36 |

Wet adhesion test is performed as the dry adhesion but after the coated lens has been placed 30 minutes in boiling water.

2. Experimental Details

Example 1

An ink receptive coating composition is obtained by mixing the following components in the amounts mentioned in table I.

TABLE I

| Ingredients | Amount (g) |
|---|---|
| Silyl PEO (Component A) | 5 |

$$H_3C-O-\underset{\underset{CH_3}{|}}{\overset{\overset{CH_3}{|}}{\underset{|}{\overset{|}{Si}}}}-R-\left[O-\diagup\diagdown\right]_n-R-\underset{\underset{CH_3}{|}}{\overset{\overset{CH_3}{|}}{\underset{|}{\overset{|}{Si}}}}-O-CH_3$$

n = 25-30

| Glymo (Cross linker, component B) | 1.07 |
| Hydrochloric acid | 0.7 |
| Methanol (organic solvent) | 15 |
| Aluminum acetylacetonate (condensation catalyst) | 0.26 |
| FC-4430 (wetting surfactant) | 0.23 |

The ink receptive coating composition of the invention is prepared as follows:
Component A is first diluted in methanol, then Glymo is added, followed by Al(Acac)$_3$ and Fc4430.
Then HCl is added after the mixing of all the other ingredients and the mixture is stirred during 24 hours at room temperature.

The ink receptive coating composition thus obtained is then spin-coated onto a biplane (flat) naked (i.e. bearing no coating) ophthalmic lenses made in ORMA® material by means of a Laurel! Spin-coater.

The ink receptive coating is applied only one side of the lens.

Then the lenses were put in an oven for 105° C. for 2 hours in order to cure the ink receptive coating composition. The thickness of the ink receptive coating is 1.5 to 2 μm.

Upon curing completion and cooling to ambient temperature, this substrate is printed using an inkjet printer.

Printing images used can be picture files (jpeg, bmp, png, etc) downloaded or edited by photo-editing software readily available.

The printed lenses are then further cured under 150 degrees (° C.) for a time of 1 h00 to 2h00, to allow imbibing of dyes into substrates.

TABLE II

|       | Haze | L     | a*    | b*     | Cross-hatch |
|-------|------|-------|-------|--------|-------------|
| 0 hr  | 1.10 | 67.48 | 58.06 | −9.53  | 0           |
| 50 hr | 1.07 | 67.86 | 57.49 | −11.02 | 0           |
| 100 hr| 1.04 | 68.49 | 55.99 | −10.31 | 0           |
| 150 hr| 1.05 | 68.84 | 55.35 | −10.05 | 0           |
| 200 hr| 1.03 | 69.27 | 54.28 | −9.50  | 0           |

The colorimetric features are evaluated in the colorimetric system CIE (1976)L*a*b*.

Example 3 to 6

Example 1 (application of the ink receptive coating on one side) is reproduced with different component A. Corresponding Tv are reported in table III:

TABLE III

| Example | Name of silyl-PEO (Component A) | Transmission (Tv) | No of EO units |
|---------|----------------------------------|-------------------|----------------|
| Ex3 | BIS[(3-METHYLDIMETHOXYSILYL)PROPYL]POLYPROPYLENE OXIDE | 65.4 | 6~8 |
| Ex4 | METHOXY(POLYETHYLENEOXY)PROPYLTRIMETHOXYSILANE | 67.2 | 10~11 |
| Ex5 | BIS(TRIETHOXYSILYLPROPYL)POLYETHYLENE OXIDE (25-30 EO) | 72.2 | 27~28 |
| Ex6 | BIS(N,N'-(TRIETHOXYSILYLPROPYL)AMINOCARBONYL]POLYETHYLENE OXIDE | 67.4 | 13~14 |

The ink receptive coating can be removed after imbibing, the removal being made by an ultrasonic bath containing methanol.

After removal, the results show a printed substrate with satisfying print quality, subjected to the resolution of the printer capability and image resolution and contrast.

Example 2

The process of example 1 is reproduced by ink jet printing homogeneously each the full surface of the lens.

The final lens after imbibing and removal of the ink receptive coating presents a very homogeneous tinting on its whole surface. It has an intense coloration.

The Tv is 42% and the haze value is 1.02%.

Hard Coat Compatibility

The final tinted lenses of example 2 are coated with the following coating composition:

The abrasion-resistant coating composition comprises by weight 224 parts of GLYMO (glycidoxypropyltrimethoxysilane), 80.5 parts of HCl 0.1N, 120 parts of DMDES (dimethyldiethoxysilane), 718 parts of a 30% weight % colloidal silica in methanol, 15 parts of aluminium acetylacetonate and 44 parts of ethylcellosolve. The composition also comprises 0.1% of the Fluorad FC-430® (3M) by weight as related to the total weight of the composition. Such a composition is disclosed in example 3 of EP 0614954.

The coated lenses are then submitted to the UV aging described in 1b) and then to the then to the cross-hatch test described in 1c).

Results reported in table II show good adhesion of the coating to tinted lenses. The color stability characterized by stable L, a and b value is in acceptable range.

Example 7

Example 1 is reproduced on an optical film (e.g. a NOF film).

The results show a printed film with acceptable print quality viewed at the naked eye. The NOF films without coating have poor printing quality, with beading phenomenon. While, film coated with Silyl PEO shows good resolution, no visible beading issue. Even after 1 hour, the image is well maintained.

Comparative Example 1

Example 1 is reproduced except that no compound A is used in the composition and the amount of HCl initially required to hydrolyze the alkoxysilyl groups is not added. Only the amount necessary for Glymo (component B) hydrolysis is added.

Free PEO molecular weight of 1000 without alkoxylsilyl end groups is used instead of component A. During curing at 105° C., the PEO formed beads at the surface of the ink receptive layer. This creates irregularities at the surface.

When tinted by ink jet, the coloration is no more homogeneous.

The invention claimed is:

1. A process for tinting an article comprising:
providing an article having a substrate and an ink receptive coating applied thereon; and
applying on the ink receptive coating a tinting solution comprising at least one dye through ink jet printing, wherein the ink receptive coating is obtained by curing an ink receptive coating composition comprising:
at least a partial hydrolyzate of a component A consisting of one or more compounds containing at least one polyalkylene oxide segment having at least three alkylene oxide units, the segment further defined as a polyethylene oxide, polypropylene oxide, or polyethylene oxide-co-polypropylene oxide segment and at least one —Si(X)$_n$ hydrolyzable group, in which n is an integer ranging from 1 to 3, and the X groups independently represent OH groups or precursors of OH groups; and optionally, at least one component B consisting of one or more compounds of formula:

$$R_nSi(Z)_{4-n'} \qquad (I)$$

or a hydrolyzate thereof, in which the R groups independently represent monovalent alkyl groups, the Z groups independently represent hydrolyzable groups or hydrogen atoms, and n' is an integer equal to 0, 1 or 2, with the proviso that the Z groups do not all represent an hydrogen atom when n'=0;

and/or one or more compounds of formula:

$$R^1{}_{n1}Y_{m1}Si(Z^1)_{4-n1-m1} \qquad (II)$$

or a hydrolyzate thereof, in which the $R^1$ groups independently represent monovalent organic groups linked to the silicon atom through a carbon atom, the Y groups independently represent monovalent organic groups linked to the silicon atom and containing at least one epoxy function, the $Z^1$ groups independently represent hydrolyzable groups or hydrogen atoms, m1 and n1 are integers such that m1 is equal to 1 or 2 and n1+m1=1 or 2, wherein component B is optional only when component A has three Si—X bonds;

wherein:
component A, and component B when present, form a cross-linked structure upon curing of the composition and the ink receptive coating composition is not an antistatic sol/gel forming coating composition comprising at least one inorganic metal salt having a dry extract containing less than 5% by weight of free polyalkylene oxide polymers; and the theoretical dry extract of component A represents 40 to 100% by weight based on the weight of the theoretical dry extract of the ink receptive coating composition.

2. The process of claim 1, wherein component A consists of one or more compounds containing at least one polyalkylene oxide segment and at least two —Si(X)$_n$ hydrolyzable groups.

3. The process of claim 2, wherein component A consists of one or more compounds containing at least one polyalkylene oxide segment and two —Si(X)$_n$ hydrolyzable groups.

4. The process of claim 1, wherein the one or more compounds of component A comprise one SiX$_3$ group, at one terminal position of the compound.

5. The process of claim 1, wherein the one or more compounds of component A comprise two —SiX$_3$ groups, one at each terminal position of the compound.

6. The process of claim 1, wherein in the X groups independently are chosen from H, a halogen atom, and OR' groups, in which R' is an alkyl radical.

7. The process of claim 1, wherein the at least one polyalkylene oxide segment of component A is a polyethylene oxide segment.

8. The process of claim 1, wherein component A comprises one or more compounds of formula:

$$(R^2O)_3Si—R^3—(CH_2CH_2O)_xR^4 \qquad (III)$$

in which:
$R^2$ independently is an alkyl group;
$R^3$ is a divalent radical;

$R^4$ is H, an alkyl radical, a $R^5C(O)$— group in which $R^5$ is an alkyl radical; or a —$R^3Si(OR^2)_3$ group in which $R^2$ and $R^3$ are defined as above; and x is an integer ranging from 4 to 50.

9. The process of claim 8, wherein:
$R^2$ independently is a $C_1$-$C_4$ alkyl group;
$R^3$ is a —$(CH_2)_{x1}$— or a —$(CH_2)_{x2}$—NHC(O)— radical in which x1 an integer from 1 to 4 and x2 is an integer from 1 to 4;
$R^4$ is a $C_1$-$C_4$ alkyl radical, a $R^5C(O)$— group in which $R^5$ is an alkyl radical, or a —$R^3Si(OR^2)_3$ group in which $R^2$ and $R^3$ are defined as above; and/or
x is an integer ranging from 4 to 50.

10. The process of claim 1, wherein the ink receptive coating is obtained by curing an ink receptive coating composition further comprising at least one component B, wherein component A and component B form a cross-linked structure upon curing of the composition.

11. The process of claim 10, wherein the least one component B is an epoxysilane.

12. The process of claim 1, wherein the theoretical dry extract of component A represents 40 to 95% by weight based on the weight of the theoretical dry extract of the composition.

13. The process of claim 1, wherein the ink receptive coating composition comprises at least one component B that represents 0 to 60% by weight based on the theoretical dry extract of the composition.

14. The process of claim 1, wherein no inorganic filler is present in the ink receptive coating.

15. The process of claim 1, wherein the tinting solution is water based.

16. The process of claim 1, wherein the at least one dye comprises at least one sublimable dye.

17. The process of claim 16, further comprising heating the article to diffuse the at least one sublimable dye from the ink receptive coating into the substrate.

18. The process of claim 17, further comprising removing the ink receptive coating.

19. The process of claim 16, wherein the substrate comprises one or more functional coating layers, the ink receptive coating being deposited on the one or more functional coating layers.

20. An ink receptive coating composition comprising:
at least a partial hydrolyzate of a component A consisting of one or more compounds containing at least one polyalkylene oxide segment having at least three alkylene oxide units, the segment further defined as a polyethylene oxide, polypropylene oxide, or polyethylene oxide-co-polypropylene oxide segment and at least one —Si (X)$_n$ hydrolyzable group, in which n is an integer ranging from 1 to 3, and the X groups independently represent OH groups or precursors of OH groups; and optionally, at least one component B consisting of one or more compounds of formula:

$$R_nSi(Z)_{4-n'} \qquad (I)$$

or a hydrolyzate thereof, in which the R groups independently represent monovalent alkyl groups, the Z groups independently represent hydrolyzable groups or hydrogen atoms, and n' is an integer equal to 0, 1 or 2, with the proviso that the Z groups do not all represent an hydrogen atom when n'=0; and/or one or more compounds of formula:

$$R^1{}_{n1}Y_{m1}Si(Z^1)_{4-n1-m1} \qquad (II)$$

or a hydrolyzate thereof, in which the $R^1$ groups independently represent monovalent organic groups linked to the silicon atom through a carbon atom, the Y groups independently represent monovalent organic groups linked to the silicon atom and containing at least one epoxy function, the $Z^1$ groups independently represent hydrolyzable groups or hydrogen atoms, m1 and n1 are integers such that m1 is equal to 1 or 2 and n1+m1=1 or 2, wherein component B is optional only when component A has three Si—X bonds;

wherein:

component A and component B, when present, form a cross-linked structure upon curing of the composition and the ink receptive coating composition is not an antistatic sol/gel forming coating composition comprising at least one inorganic metal salt having a dry extract containing less than 5% by weight of free polyalkylene oxide polymers; and the theoretical dry extract of component A represents 40 to 100% by weight based on the weight of the theoretical dry extract of the ink receptive coating composition.

21. The ink receptive coating composition of claim 20, wherein component A consists of one or more compounds containing at least one polyalkylene oxide segment and at least two —Si(X)$_n$ hydrolyzable groups.

22. The ink receptive coating composition of claim 20, further defined as comprising at least one component B, wherein component A and component B form a cross-linked structure upon curing of the composition.

23. The ink receptive coating composition of claim 22, wherein the at least one component B is an epoxysilane.

24. A process for tinting an article comprising:
obtaining an article;
obtaining an ink receptive coating composition of claim 20; and
applying the composition to the article;
wherein the article is tinted.

* * * * *